United States Patent
Lee et al.

(10) Patent No.: US 10,554,875 B2
(45) Date of Patent: Feb. 4, 2020

(54) APPARATUS FOR CONTROLLING POSITION OF CAMERA MODULE USING PEAK DETECTION

(71) Applicant: SAMSUNG ELECTRO-MECHANICS CO., LTD., Suwon-si (KR)

(72) Inventors: Joo Hyoung Lee, Suwon-si (KR); Woo Young Choi, Suwon-si (KR); Sang Hoon Kim, Chuncheon-si (KR); Joo Yul Ko, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 57 days.

(21) Appl. No.: 15/701,576

(22) Filed: Sep. 12, 2017

(65) Prior Publication Data
US 2018/0146130 A1    May 24, 2018

(30) Foreign Application Priority Data

Nov. 21, 2016 (KR) ........................ 10-2016-0154705
Feb. 10, 2017 (KR) ........................ 10-2017-0018737
May 19, 2017 (KR) ........................ 10-2017-0062561

(51) Int. Cl.
*H04N 5/232* (2006.01)
*G02B 7/08* (2006.01)
(Continued)

(52) U.S. Cl.
CPC ........... *H04N 5/23212* (2013.01); *G02B 7/04* (2013.01); *G02B 7/08* (2013.01); *G03B 3/10* (2013.01);
(Continued)

(58) Field of Classification Search
CPC ............. H04N 5/23212; H04N 5/2254; H04N 5/2257; H04N 5/23287; G02B 7/04;
(Continued)

(56) References Cited

U.S. PATENT DOCUMENTS 5,055,784 A   10/1991  Jaeger et al.
5,698,910 A   12/1997  Bryant et al.
(Continued)

FOREIGN PATENT DOCUMENTS

JP    61-82174 A        4/1986
JP    2004-354531 A    12/2004
(Continued)

OTHER PUBLICATIONS

Learn and Grow, "Sample and hold circuit", posted date Nov. 10, 2016, https://www.youtube.com/watch?v=qQytbsevBBk (Year: 2016).*
(Continued)

*Primary Examiner* — Lin Ye
*Assistant Examiner* — Chan T Nguyen
(74) *Attorney, Agent, or Firm* — NSIP Law

(57) ABSTRACT

An apparatus is provided to control a position of a camera module. The apparatus includes a magnetic member disposed on a lens barrel of the camera module, a coil disposed opposite to the magnetic member, and a driver configured to generate to the coil a position confirmation signal including a specific frequency component. The apparatus also includes a signal extractor configured to extract a detected signal, including the specific frequency component, from a coil signal of the coil, and a peak detector detect a peak value of the detected signal and output a position signal corresponding to a position of the magnetic member based on the peak value.

15 Claims, 12 Drawing Sheets

(51) Int. Cl.
  *G03B 5/00* (2006.01)
  *G02B 7/04* (2006.01)
  *G03B 3/10* (2006.01)
  *H04N 5/225* (2006.01)

(52) U.S. Cl.
  CPC ............. *G03B 5/00* (2013.01); *H04N 5/2254* (2013.01); *H04N 5/2257* (2013.01); *G03B 2205/0015* (2013.01); *G03B 2205/0046* (2013.01); *G03B 2205/0069* (2013.01); *H04N 5/23287* (2013.01)

(58) Field of Classification Search
  CPC .... G02B 7/08; G03B 2205/0069; G03B 5/00; G03B 3/10; G03B 2205/0015; G03B 2205/0046
  USPC ........................................................ 348/345
  See application file for complete search history.

(56) References Cited

U.S. PATENT DOCUMENTS

| | | |
|---|---|---|
| 2006/0164075 A1 | 7/2006 | Niwa |
| 2007/0188620 A1* | 8/2007 | Takahashi ............ G02B 27/646 348/208.99 |
| 2009/0224716 A1 | 9/2009 | Vig et al. |
| 2013/0050828 A1* | 2/2013 | Sato ........................ G02B 27/64 359/557 |
| 2015/0229814 A1 | 8/2015 | Macours et al. |
| 2016/0258736 A1 | 9/2016 | Bachar et al. |
| 2017/0350727 A1 | 12/2017 | Von Dahl et al. |

FOREIGN PATENT DOCUMENTS

| | | | | |
|---|---|---|---|---|
| JP | 2006-138954 A | | 6/2006 | |
| KR | 10-1166418 B1 | | 7/2012 | |
| KR | 101166418 | * | 7/2012 | ............... G01B 7/00 |
| KR | 10-2014-0088308 A | | 7/2014 | |
| KR | 10-2015-0097998 A | | 8/2015 | |
| KR | 20150097998 | * | 8/2015 | ............... G03B 3/10 |
| KR | 10-2016-0110032 A | | 9/2016 | |

OTHER PUBLICATIONS

Learn and Grow, "Sample and Hold Circuit", posted date Nov. 10, 2016, https://www.youtube.com/watch?v=aQytbsevBBk (Year: 2016).*
Korean Office Action dated Nov. 29, 2018, in counterpart Korean Application No. 10-2017-0062561 (10 pages in English, 6 pages in Korean).
United States Office Action dated Apr. 18, 2019 in related U.S. Appl. No. 15/725,532 (30 pages in English).

* cited by examiner

APPARATUS FOR CONTROLLING POSITION OF CAMERA MODULE USING PEAK DETECTION

CROSS-REFERENCE TO RELATED APPLICATION(S)

This application claims benefit under 35 U.S.C. § 119(a) of Korean Patent Application No. 10-2016-0154705 filed on Nov. 21, 2016, Korean Patent Application No. 10-2017-0018737 filed on Feb. 10, 2017, and Korean Patent Application No. 10-2017-0062561 filed on May 19, 2017 in the Korean Intellectual Property Office, the disclosures of which are incorporated herein by reference in their entirety.

BACKGROUND

1. Field

The following description relates to an apparatus to control a position of a camera module.

2. Description of Related Art

In order to provide portable communication terminals, such as mobile phones, personal digital assistants (PDAs), portable personal computers (PCs), and other similar electronic devices, it is desired for a camera module for such portable communication terminals to have a small thickness, with a structural configuration that is able capture a high resolution image. In order to satisfy such configuration, a lens is needed to be included in the camera module with a high aspect ratio, capable of performing effective autofocusing, optical image stabilization (OIS), or the like. However, in order to perform autofocusing or OIS, it is necessary to accurately detect a current position value of the lenses and determine an accurate position of the lenses.

As an existing technology, a method to perform position control using a hall sensor and a magnet for sensing a position may be used.

In the case of using the hall sensor, a separate magnet may be required. In this case, a reference value for a position of the hall sensor may be changed, depending on temperature or other external particulars. Therefore, in order to correct such a problem, an additional circuit such as a low pass filter, an automatic gain control (AGC), a differential to single amplifier, an analog to digital converter, or the like, is required.

Further, when implementing an external hall sensor in the camera module, a bias current (having a level of several milliamperes for example) to drive the hall sensor may be consumed, and current may be additionally consumed by various amplifiers (AMPs), and other electronic circuits.

In order to solve problems such as mechanical design limitations of camera modules, additional current consumption, and a rise in material costs, and other problems, as described above, an apparatus configured to perform position detection and position control without using the hall sensor is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An apparatus is described to control a position of a camera module in which a separate sensor, such as a hall sensor, is excluded. The lens barrel is driven and a position thereof is detected and determined through a coil.

In accordance with an embodiment, there is provided an apparatus to control a position of a camera module, including: a magnetic member disposed on a lens barrel of the camera module; a coil disposed opposite to the magnetic member; a driver configured to generate to the coil a position confirmation signal including a specific frequency component; a signal extractor configured to extract a detected signal, including the specific frequency component, from a coil signal of the coil; and a peak detector detect a peak value of the detected signal and output a position signal corresponding to a position of the magnetic member based on the peak value.

The driver may be configured to output the coil signal, the coil signal including the position confirmation signal overlapped with a driving signal.

The peak detector may be configured to detect impedance of the coil using the peak value of the detected signal and the position confirmation signal, and output the position signal corresponding to the position of the magnetic member based on the impedance of the coil.

The driver may further include: a driving signal generating circuit configured to generate driving gate signals and to overlap a position confirmation gate signal with a driving gate signal having an active level, among the driving gate signals, to output an overlapping signal; and a driving switching circuit including driving switches connected between a power supply voltage terminal and one end of the coil, between the power supply voltage terminal and another end of the coil, between one end of the coil and a ground, and between another end of the coil and the ground, respectively.

The driving switches may be configured to generate a driving signal and the position confirmation signal based on the driving gate signals and the position confirmation gate signal and output the driving signal and the position confirmation signal to the coil.

The driving switching circuit may be configured in one of a half bridge form in which the coil may be unidirectionally driven from a reference point and a full bridge form in which the coil may be bidirectionally driven from a reference point.

The driving signal may be a direct current (DC) current, the position confirmation signal may be an alternating current (AC) current including the specific frequency component, and the detected signal may be an AC voltage including the specific frequency component.

The apparatus may further include: a controller configured to generate a feedback signal to the driver to control a position error, based on the position signal from the peak detector and a position reference signal.

The peak detector may include a rectifying circuit configured to rectify the detected signal, generate a rectified signal indicative thereof, and output the rectified signal as the position signal.

The peak detector may further include: a sample/hold circuit configured to sample and hold the detected signal; and a maximum value detector configured to detect a maximum value among signals sampled and held by the sample/hold circuit and output the maximum value as the position signal.

The apparatus may further include: a controller configured to calculate an impedance of the coil using a ratio between a detected voltage and a position confirmation current, wherein the detected signal may be the detected voltage and the position confirmation signal may be the position confirmation current.

In accordance with an embodiment, there is provided an apparatus to control a position of a camera module, including: a magnetic member disposed on a lens barrel of the camera module; a coil disposed to face the magnetic member; a driver configured to generate a position confirmation signal to the coil including a specific frequency component to the coil; a signal extractor configured to extract a detected signal, including the specific frequency component, based on a coil signal of the coil; and a peak detector configured to detect a magnitude of impedance of the coil using a maximum value of the detected signal and the position confirmation signal and output a position signal corresponding to a position of the magnetic member based on the magnitude of the impedance of the coil.

The driver may be configured to generate the coil signal, wherein the coil signal may include an overlap of the position confirmation signal and a driving signal.

The driver may include: a driving signal generating circuit configured to generate driving gate signals and overlap a position confirmation gate signal with a driving gate signal including an active level, among the driving gate signals, to generate an overlapping signal; and a driving switching circuit including driving switches connected between a power supply voltage terminal and one end of the coil, between the power supply voltage terminal and another end of the coil, between one end of the coil and a ground, and between another end of the coil and the ground, respectively.

The driving switches may be configured to generate a driving signal and the position confirmation signal based on the driving gate signals and the position confirmation gate signal and output the driving signal and the position confirmation signal to the coil.

The driving signal may be a DC current, the position confirmation signal may be an AC current having the specific frequency component, and the detected signal may be an AC voltage including the specific frequency component.

The apparatus may further include: a controller configured to produce a feedback signal to the driver to control a position error, based on the position signal from the peak detector and a position reference signal.

The peak detector may include a rectifying circuit configured to rectify the detected signal and output the rectified signal as the position signal.

The peak detector may further include: a sample/hold circuit configured to sample and hold the detected signal; and a maximum value detector configured to detect a maximum value among signals sampled and held by the sample/hold circuit and output the maximum value as the position signal.

Other features and aspects will be apparent from the following detailed description, the drawings, and the claims.

Figure 1:
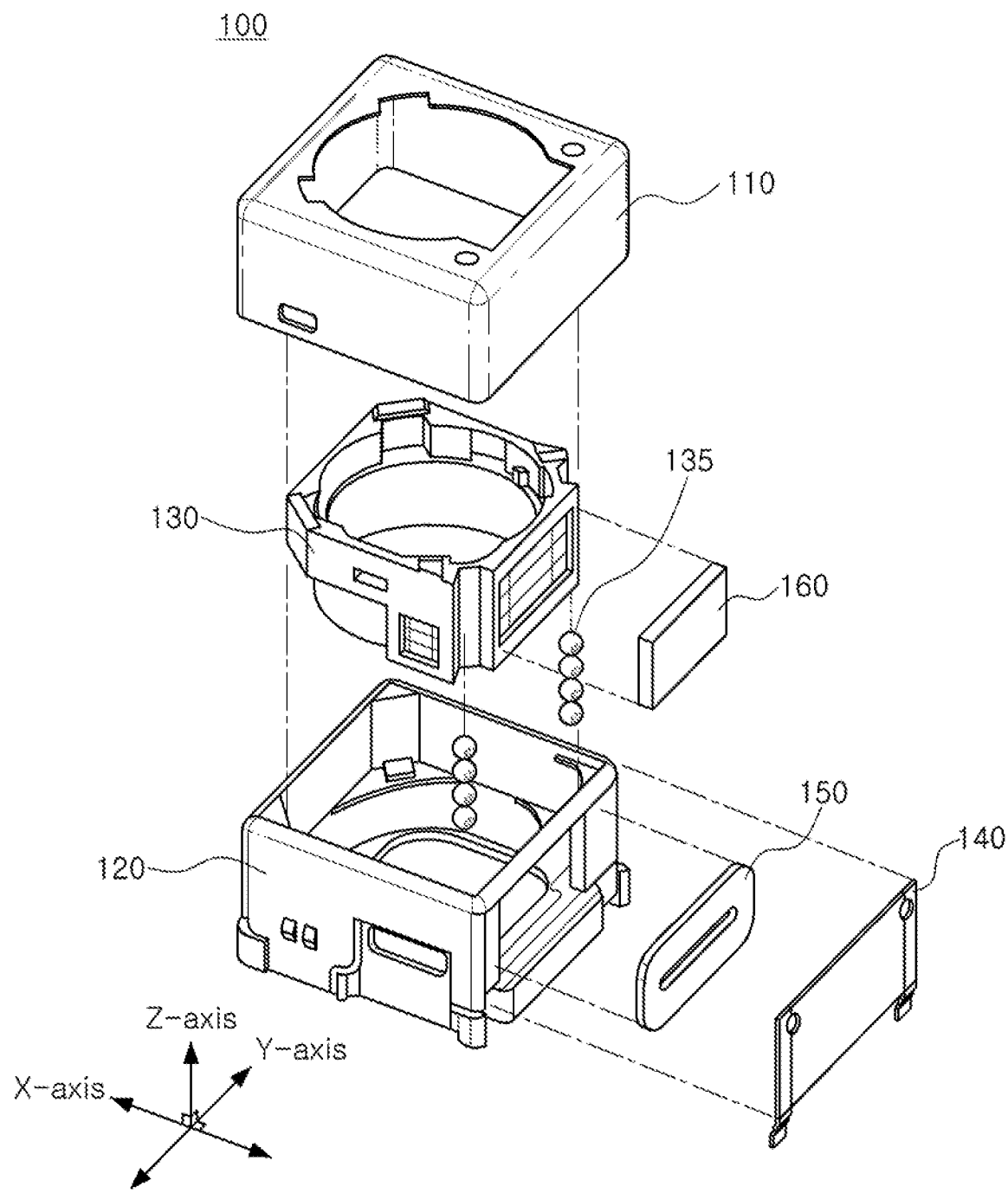
FIG. 1 is an exploded perspective view illustrating a camera module, according to an example.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The features described herein may be embodied in different forms, and are not to be construed as being limited to the examples described herein. Rather, the examples described herein have been provided so that this disclosure will be thorough and complete, and will convey the full scope of the disclosure after an understanding of the disclosure of this application.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

When an element is referred to as being "on," "connected to," "coupled to," or "adjacent to," another element, the element may be directly on, connected to, coupled to, or adjacent to, the other element, or one or more other intervening elements may be present.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms, including technical terms and scientific terms, used herein have the same meaning as how they are generally understood after an understanding of the disclosure of this application. Any term that is defined in a general dictionary shall be construed to have the same meaning in the context of the relevant art, and, unless otherwise defined explicitly, shall not be interpreted to have an idealistic or excessively formalistic meaning.

Identical or corresponding elements will be given the same reference numerals, regardless of the figure number, and any redundant description of the identical or corresponding elements will not be repeated. Throughout the description of the present disclosure, when describing a certain relevant conventional technology is determined to evade the point of the present disclosure, the pertinent detailed description will be omitted. Terms such as "first" and "second" can be used in describing various elements, but the above elements shall not be restricted to the above terms. The above terms are used only to distinguish one element from the other. In the accompanying drawings, some elements may be exaggerated, omitted or briefly illustrated, and the dimensions of the elements do not necessarily reflect the actual dimensions of these elements.

FIG. 1 is an exploded perspective view illustrating a camera module, according to an example.

Referring to FIG. 1, the camera module 100, according to an example, includes a case 110, a housing 120, a lens barrel 130, a substrate 140, a coil 150, and a magnetic member 160.

In addition, the camera module 100 may further include ball bearings 135. Although FIG. 1 illustrates four ball bearings 135 to move the lens barrel 130 in an optical axis direction, a single ball bearing 135 may be implemented or more, on each guide portion of the lens barrel 130.

A ball bearing type camera module using the ball bearings is illustrated in FIG. 1. However, the present disclosure is not limited thereto, and may also be applied to a spring type camera module.

The lens barrel 130 may have a hollow cylindrical shape so that at least one lens imaging a subject is positioned and accommodated therein. The lens are disposed in the lens barrel 130 along an optical axis direction, from an object side (position of subject) to an image side (position of image sensor). Here, the optical axis direction refers to a Z-direction, in relation to the lens barrel 130, illustrated in FIG. 1. Also, the optical axis is a line along which there is some degree of rotational symmetry in an optical system such as a camera lens or microscope. The optical axis is an imaginary line that defines the path along which light propagates through at least one lens, up to first approximation. For a lens system including lenses and mirrors, the axis passes through the center of curvature of each surface, and coincides with the axis of rotational symmetry. The optical axis is often coincident with the system's mechanical axis, but not always, as in the case of off-axis optical systems.

The lens barrel 130 is disposed in the housing 120 and is coupled to the housing 120 to move in the optical axis direction for the purpose of autofocusing and move in directions (for example, an X-axis direction and a Y-axis direction) perpendicular to the optical axis direction for the purpose of optical image stabilization (OIS). Although the lens barrel 130 is illustrated in FIG. 1 as a single structural element, in an alternative example, the lens barrel 130 may be formed of multiple pieces, which would be coupled, bonded, fused, or attached to each other using a mechanical element, such as a bracket, into a single piece as shown in FIG. 1 for the lens barrel 130.

The housing 120 has an internal space to accommodate the lens barrel 130 therein so that the lens barrel 130 moves along the optical axis direction (Z-direction) or in directions perpendicular (X-axis direction or Y-axis direction) to the optical axis direction.

At least one ball bearing among the ball bearings 135 is provided in the optical axis direction within the lens barrel 130, as a guide to guide movement of the lens barrel 130 when the lens barrel 130 moves in the optical axis direction within the housing 120.

At least one ball bearing 135 may be disposed between the lens barrel 130 and the housing 120 so that one surface of the lens barrel 130 and one surface of the housing 120 are in contact with each other, and guides the movement of the lens barrel 130 in the optical axis direction while supporting the lens barrel 130 through a rolling motion.

The case 110 is coupled to the housing 120 to form an exterior of the camera module. The case 110 is coupled to the housing 120 to surround portions of outer surfaces of the housing 120. The case 110 may include a metal or be formed of a metal to be grounded to a ground pad of the substrate mounted on one side surface of the housing 120, resulting in blocking the electromagnetic waves generated during driving of the camera module. In accordance with an embodiment, the housing 120 and the lens barrel 130 include guide parts to receive the ball bearings 135. A shape of one of the guide parts may be different from that of the other guide parts. For example, the one of the guide parts may be formed as a V-like groove, and the other guide parts may be formed as a U-like groove. A shape of the other guide parts is not particularly limited to a particular shape as long as, in one example, the other guide parts are different from the shape of the one of the guide parts. In an alternative example, all of the guide parts include a same shape.

In the case in which the other guide parts is different from that of the guide part, a separation of the ball member 135 may be prevented while the lens barrel 135 is vertically moved for autofocusing. In an example, at least one of the guide parts may have a flat surface or a flat surface connected to an inclined portion.

The magnetic member 160 is disposed on one side surface of the lens barrel 130, and the coil 150 is disposed on one surface of the substrate 140 mounted on one side surface of the housing 120 to face or opposite to the magnetic member 160. As an example, the magnetic member 160 is a magnet including a magnetic material having a magnet property or be a conductor.

Although not illustrated in FIG. 1, a stopper may be additionally disposed between the case 110 and the lens barrel 130 to limit a movement distance of the lens barrel 130. In one example, the stopper is a single structural element. In another example, the stopper is be formed of at least two separate plates operatively and mechanically connected to each other to, at least, restrict the travel distance of a lens module including the lenses. In addition, the camera module 100 may further include a yoke mounted on the other surface of the substrate 140 to prevent leakage of a magnetic flux generated between the magnetic member 160 and the coil 150.

A structure in which an alternating current (AC) current is used as a position confirmation signal and a detected voltage is used as a detected signal is described in the present application, but the present application is not limited thereto. That is, a structure in which an AC voltage is used as the position confirmation signal and an AC current is used as the detected signal may be used.

In the respective drawings in the present application, overlapping descriptions of components denoted by the same reference numerals and having the same functions will be omitted, and contents different from each other will be described in the respective drawings.

Figure 2:
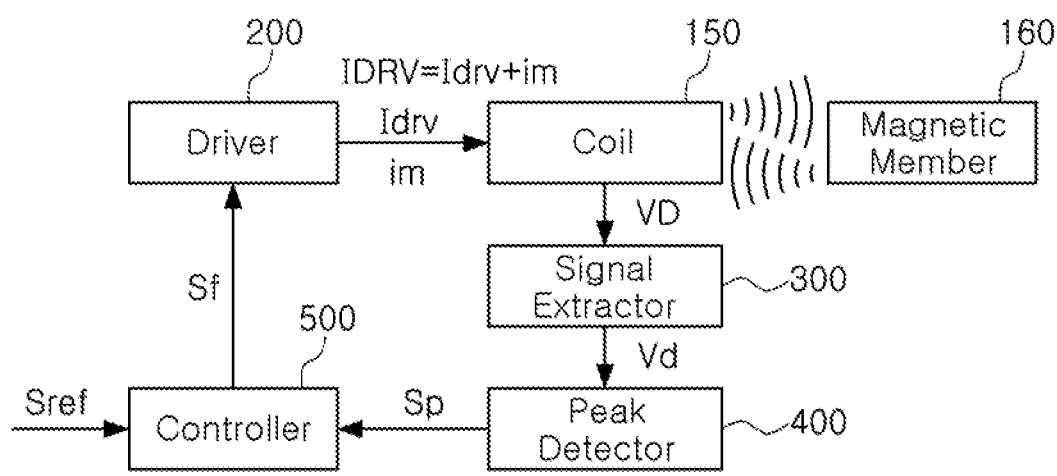
FIG. 2 is a block diagram illustrating an apparatus to control a position of a camera module, according to an example.
Figure 3:
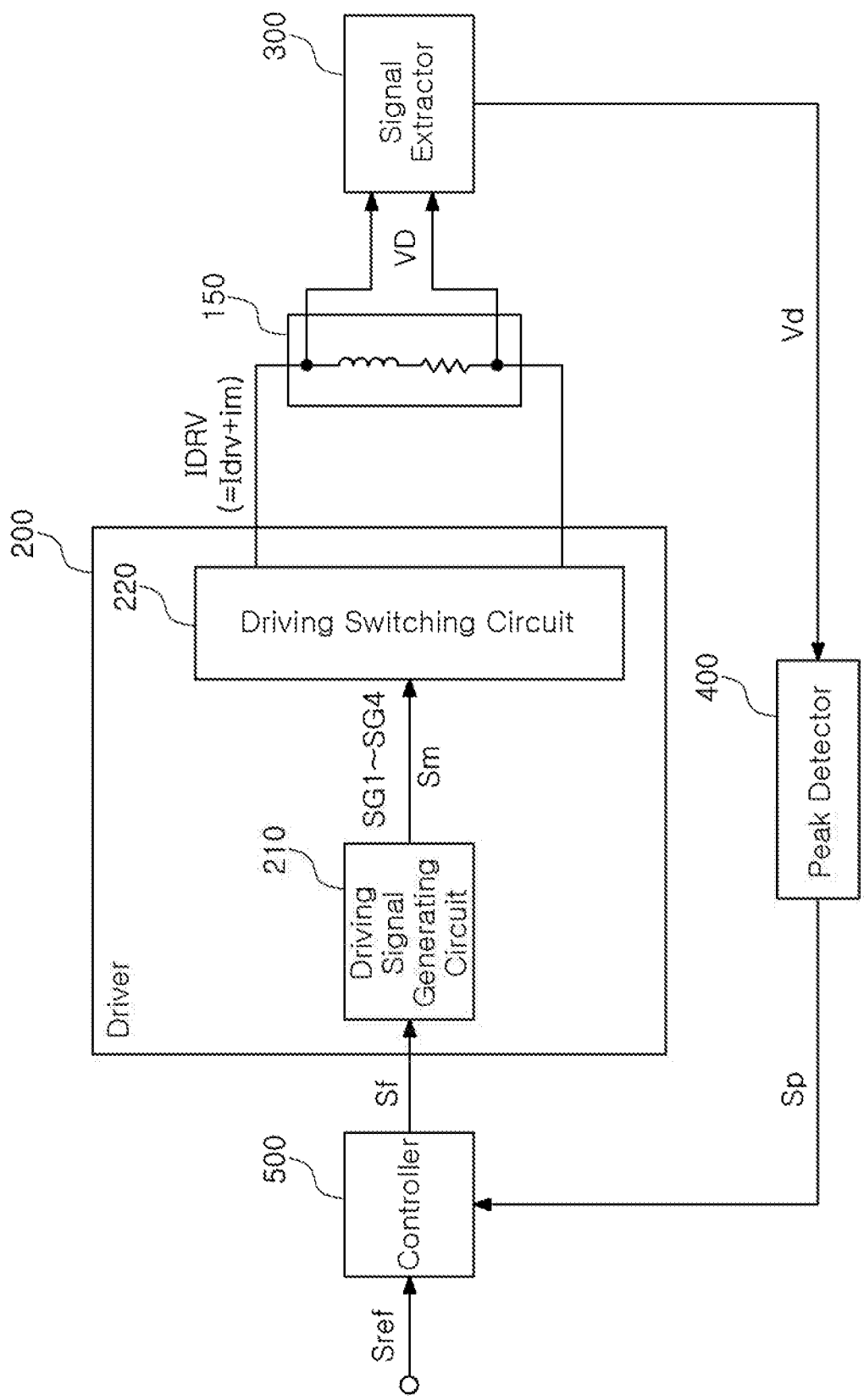
FIG. 3 is a block diagram illustrating an example of the apparatus to control a position of a camera module of FIG. 2.

FIG. 2 is a block diagram illustrating an apparatus to control a position of a camera module, according to an example. FIG. 3 is a block diagram illustrating the apparatus to control a position of a camera module of FIG. 2.

The apparatus for controlling a position of a camera module, according to an example, will be described with reference to FIGS. 2 and 3.

The apparatus to control a position of a camera module includes a coil 150, a magnetic member 160, a driver 200, a signal extractor 300, and a peak detector 400. In addition, the apparatus to control a position of the camera module further includes a controller 500.

The coil 150 is disposed on one surface of the substrate 140 (see FIG. 1), which is mounted on one side surface of the housing 120 (see FIG. 1), opposite to or to face the magnetic member 160. The coil 150 is spaced apart from the magnetic member 160 to provide a driving force to the magnetic member 160 through an electromagnetic force. As an example, the coil 150 modeled as a resistance component Rs and an inductance component Lx is illustrated in FIG. 3.

The magnetic member 160 is disposed on one side surface of the lens barrel 130, and moves due to the driving force from the coil 150.

The driver 200 outputs or generates a position confirmation signal im to the coil 150. The position confirmation signal im is an AC signal includes a specific frequency component Fmod to detect impedance of the coil 150. The specific frequency component Fmod, is a frequency that is indicative of an amount of change in the impedance of the coil 150 without having an influence on driving of the lens barrel 130, is higher than an audio frequency. As an example, the frequency component, Fmod, is generally higher than 20 to 20,000 Hz.

As an example, the driver 200 outputs or generates the position confirmation signal im independently of a driving signal Idrv to the coil 150. As another example, the driver 200 generates or outputs a coil signal IDRV in which the position confirmation signal im and the driving signal Idrv overlap each other or are added to the coil 150 to accurately and rapidly perform a closed loop position control.

As an example, the position confirmation signal im, which is an AC signal including at least one specific frequency component Fmod, may be a sinusoidal wave signal, a triangle wave signal, a sawtooth wave signal, a square wave signal, or other type of signal.

In each embodiment in the present application, the position confirmation signal im is not limited to the signals described above, but may be any AC signal including a specific frequency component.

As an example, the driver 200 may further include a driving signal generating circuit 210 and a driving switching circuit 220.

The driving signal generating circuit 210 generates a plurality of driving gate signals SG1 to SG4, and overlaps a position confirmation gate signal Sm with one driving gate signal having an active level, among the plurality of driving gate signals SG1 to SG4 to provide an overlapping signal. In an example, the active level refers to a direct current (DC) voltage level making a corresponding transistor an active state so that a current flows to a transistor, a corresponding driving switch. As an example, the active level is higher than a zero voltage or is lower than a level of a power supply voltage. When the active level is controlled, a DC current flowing through the corresponding transistor may be controlled.

The driving switching circuit 220 generates a coil signal IDRV including the driving signal Idrv and the position confirmation signal im, depending on the plurality of driving gate signals SG1 to SG4 and the position confirmation gate signal Sm, and generates or outputs the coil signal IDRV to the coil 150.

For example, when the driver 200 applies the driving signal Idrv to the coil 150, an electromagnetic force is generated while current flows through the coil 150, and the driving force is provided to the magnetic member 160 by such electromagnetic force.

That is, the driver 200 applies the driving signal Idrv to the coil 150 to provide the driving force to the magnetic member 160. As an example, when the driver 200 applies the driving signal Idrv to the coil 150, a magnetic field is generated in the coil 150, and the magnetic field generated in the coil 150 interacts with a magnetic field of the magnetic member 160 to generate the driving force that moves the lens barrel 130 in the optical axis direction (or the directions perpendicular to the optical axis direction) depending on Fleming's left hand rule.

Therefore, the driving force drives the lens barrel 130 to move in the optical axis direction or the directions perpendicular to the optical axis direction.

As an example, the driver 200 includes a driver integrated circuit (IC) configured to generate the driving signal to the magnetic member 160.

As an example, in response to the coil signal IDRV being a coil current, the driving signal Idrv is a DC current generated by the driver 200 that drives the lens barrel 130 in the optical axis direction or the directions perpendicular to the optical axis direction, depending on a control of the controller 500 (see FIG. 2). The position confirmation signal im is generated by the driver 200 to confirm a position of the lens barrel 130, and is the AC current having the specific frequency component Fmod.

For example, upon the coil signal IDRV being the coil current, the coil current IDRV is represented by the following Equation 1:

$$IDRV = Idrv + im = Idrv + k*\sin(2*\pi*Fmod*t) \quad \text{[Equation 1]}$$

Here, Idrv is a DC driving current corresponding to the driving signal, and im, an AC position confirmation current corresponding to the position confirmation signal, which are defined by $k*\sin(2*\pi*Fmod*t)$. In addition, k is an amplitude of the position confirmation current.

A magnitude k and a frequency Fmod of the position confirmation signal im are in a range in which the magnitude, k, and the specific frequency component, Fmod, measure an amount of change in inductance of the coil 150 without having an influence on the driving of the lens barrel 130. As an example, the magnitude k of the position confirmation signal im is smaller than that of the driving signal to prevent an influence on the driving of the lens barrel 130. Further, the specific frequency component Fmod of the position confirmation signal im does not have an influence on the driving of the lens barrel 130. Here, a phrase "does not have an influence on the driving" means that the frequency should be a frequency that does not generate movement or resonance on the lens barrel.

For example, the magnitude k of the position confirmation signal im is smaller than that of the driving signal, and the frequency Fmod of the position confirmation signal im is higher than an audio frequency. As an example, in a case in which the magnitude of the driving signal is 100 mA, the magnitude k of the position confirmation signal im may be 5 mA, and the specific frequency component Fmod of the position confirmation signal im is 100 kHz.

The signal extractor 300 extracts a detected signal Vd including the specific frequency component Fmod from the coil signal IDRV of the coil 150.

As an example, the signal extractor 300 includes a filter that extracts an AC detected signal Vd including the specific frequency component Fmod.

The coil signal IDRV may be an overlapping current or an overlapping voltage. In an example in which the coil signal IDRV is the coil current, when the coil current IDRV flows through the coil 150, the signal extractor 300 extracts a detected AC voltage Vd from a voltage VD across the coil 150. In one example, the voltage VD across the coil 150, a voltage by the coil signal IDRV, includes a voltage Vdrv (see FIG. 10B) by the driving signal Idrv and the detected voltage Vd by the position confirmation signal im.

The detected signal Vd, a signal extracted from the voltage across the coil 150, is an AC voltage having the specific frequency component Fmod.

The peak detector 400 detects a peak value of the detected signal Vd, and generates a position signal Sp corresponding to a position of the magnetic member 160 based on the peak value of the detected signal Vd.

The peak detector 400 detects an impedance ZL of the coil 150 using the peak value of the detected signal Vd and the position confirmation signal im, and generates or outputs the position signal Sp corresponding to the position of the magnetic member 160 based on the impedance of the coil 150.

That is, the peak detector 400 detects the position of the magnetic member 160 based on the impedance of the coil 150 changing depending on or varying based on the movement of the magnetic member 160.

In an example in which the detected signal Vd is the detected voltage and the position confirmation signal im is the position confirmation current, the impedance of the coil 150 is calculated using a ratio between the detected voltage Vd and the position confirmation current im.

As described above, the peak detector 400 detects the position of the lens barrel 130 driven by the driver 200, more specifically, the position of the magnetic member 160 provided on one side surface of the lens barrel 130. The peak detector 400 generates or outputs the position signal Sp corresponding to the detected position of the magnetic member 160 to the controller 500.

As an example, the peak detector 400 calculates a magnitude of the impedance of the coil 150 depending on the peak value of the detected voltage to detect the position of the lens barrel 130.

Figure 11:
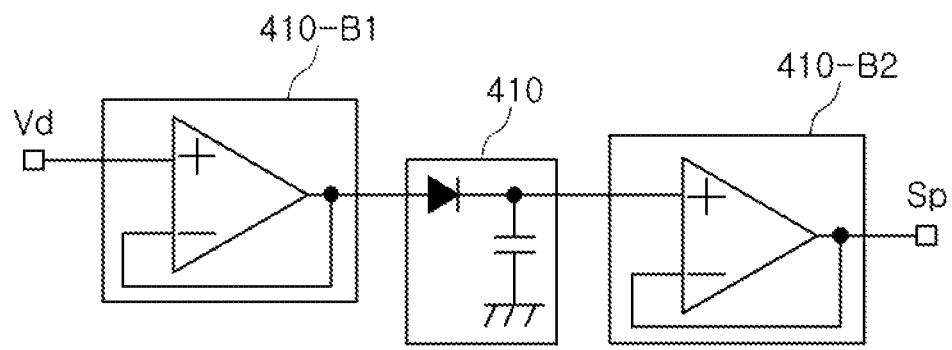
FIG. 11 is a block diagram illustrating an example of a peak detector, according to an example.
Figure 12:
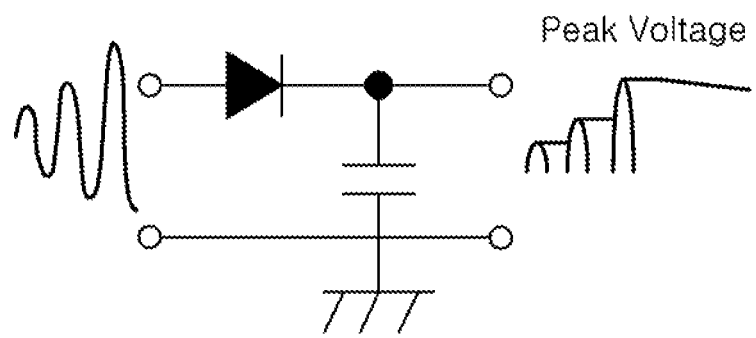
FIG. 12 is a schematic view illustrating waveforms of an input signal and an output signal of the peak detector of FIG. 11.
Figure 13:
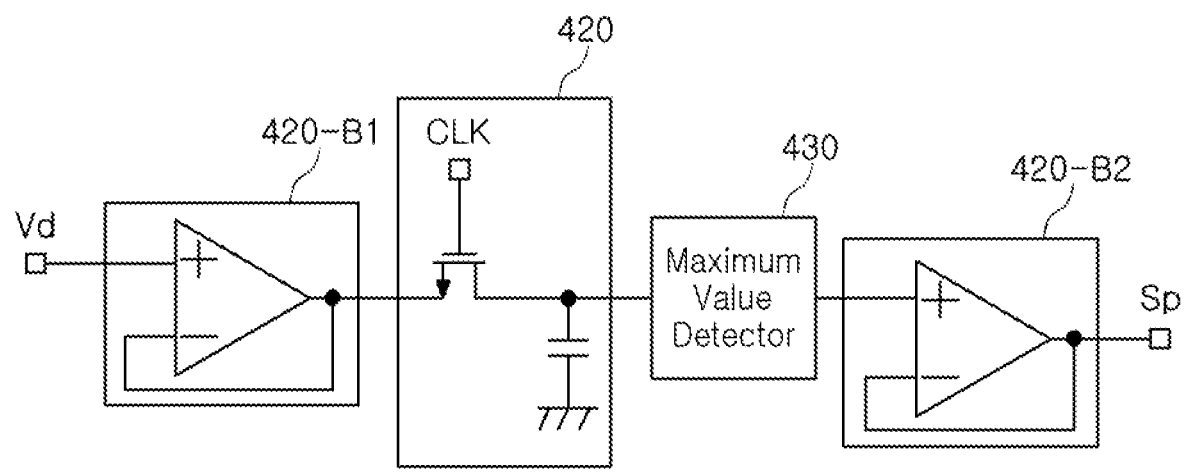
FIG. 13 is a block diagram illustrating another example of a peak detector, according to an example.

The peak detector 400, according to each embodiment in the present application, is not limited to embodiments illustrated in FIGS. 11 through 13.

The controller 500 generates, outputs, or produces to the driver 200 a feedback signal Sf to control a position error, based on the position signal Sp from the peak detector 400 and a position reference signal Sref. Here, the position reference signal Sref is a reference position that becomes a target, and is provided from an element disposed external to the camera module, such as a controller. The feedback signal Sf is a position feedback signal generated in the controller 500 and transferred to the driver 200.

As an example, the controller 500 compares the position signal Sp provided from the peak detector 400 and the position reference signal Sref with each other. The controller 500 generates or outputs to the driver 200 the feedback signal Sf to compensate for the position error corresponding to a difference between the position signal Sp and the position reference signal Sref to precisely control the position of the magnetic member 160.

As an example, the driver 200, the signal extractor 300, the peak detector 400, and the controller 500 are mounted on the substrate 140 or are mounted on a specific substrate separate from the substrate 140, the substrate 140 or the specific substrate may be a flexible printed circuit board (FPCB). In one example, the substrate 140 is a single FPCB or a plurality of FPCBs coupled together through, for example, soldering, welding, or connectors, such as a bracket. The substrate 140 is disposed on one side surface of the housing 120 as illustrated in FIG. 1 or is disposed in an inner hollow of the lens barrel 130.

Here, a position of the specific substrate is not particularly limited. That is, the specific substrate may be disposed in the camera module.

In addition, the driver 200, the signal extractor 300, the peak detector 400, and the controller 500 may be implemented as one integrated circuit (IC) and may be disposed on one substrate or may be implemented as two or more integrated circuits and may be disposed on one substrate or two or more substrates, if necessary, by a manufacturer. Such an integrated circuit is not limited to being disposed in a specific position, but may be disposed at any position.

Then, the driver 200 adjusts the driving gate signals based on the feedback signal Sf provided from the controller 500 to correct the driving signal Idrv, and the corrected driving signal Idrv is transmitted to, output to or generated to the coil 150. As described above, the driver 200 applies the driving signal to the coil 150 to provide the driving force corresponding to the electromagnetic force to the magnetic member 160 (see FIG. 2). Therefore, the position of the lens barrel 130 is accurately controlled, based on the driving force between the coil 150 and the magnetic member 160.

Meanwhile, in each embodiment in the present application, the coil 150 is driven in a voice coil motor scheme by the driver, as described below. As described below with reference to FIGS. 4 and 5, a driving switching circuit of the driver 200 is configured in half bridge form in which the coil may be unidirectionally driven from a reference point or may be configured in a full bridge form in which the coil may be bidirectionally driven from a reference point. A scheme of driving the coil is not limited to the abovementioned example.

Figure 4:
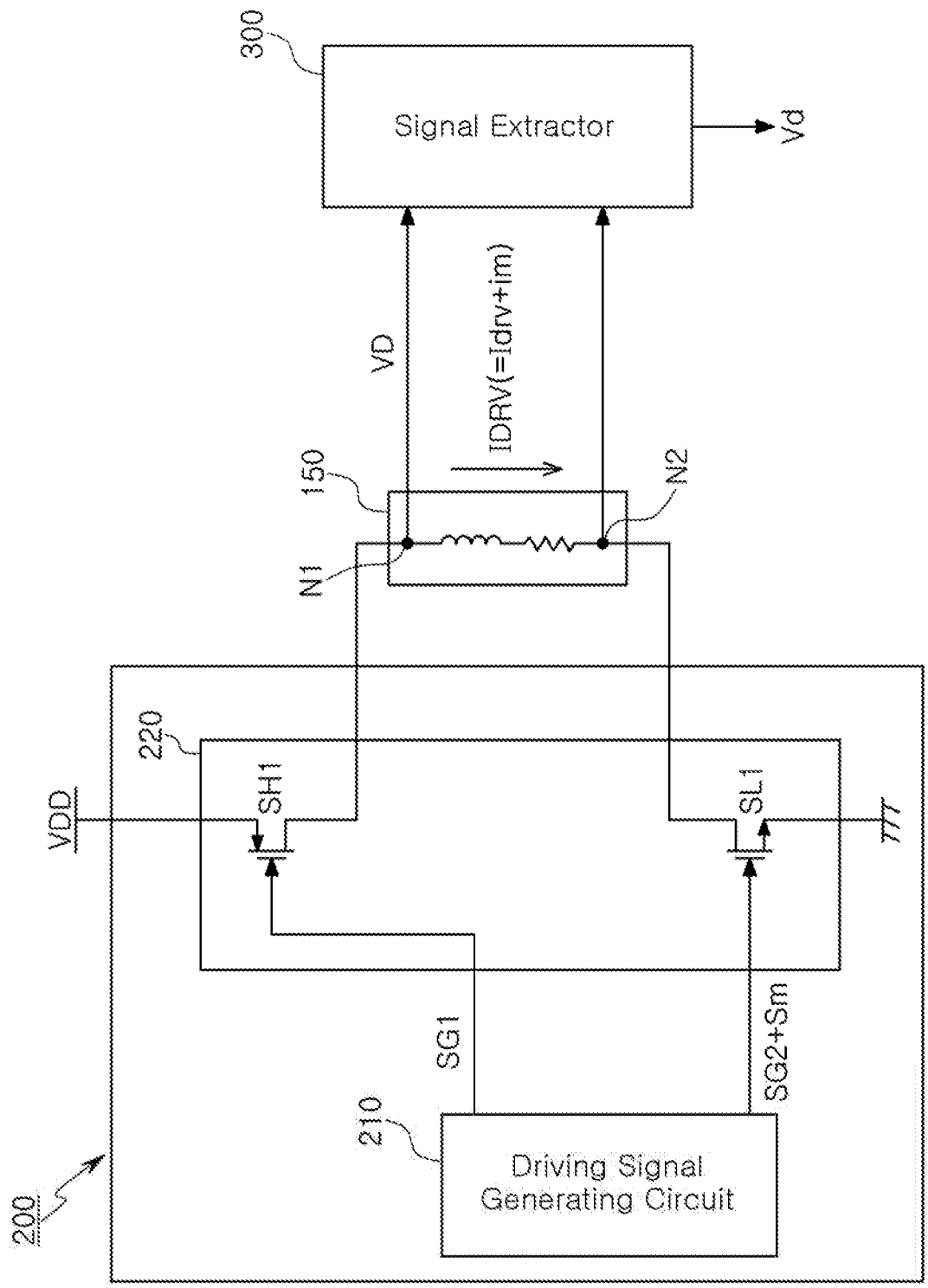
FIG. 4 is a block diagram illustrating an example of a driver of FIG. 3.

FIG. 4 is a block diagram illustrating an example of a driver of FIG. 3.

Referring to FIG. 4, as an example, the driver 200 includes a driving signal generating circuit 210 and a driving switching circuit 220.

The driving signal generating circuit 210 generates first and second driving gate signals SG1 and SG2, and overlaps a position confirmation gate signal Sm with one SG1 or SG2 of the first and second driving gate signals SG1 and SG2 to provide an overlapping signal.

The driving switching circuit 220 includes a first driving switch SH1 connected between a power supply voltage (VDD) terminal and one end N1 of the coil 150 and a second driving switch SL1 connected between the other end N2 of the coil 150 and a ground. The first and second driving switches SH1 and SL1 generate a coil signal IDRV including the driving signal Idrv and the position confirmation signal im based on the first and second driving gate signals SG1 and SG2 and the position confirmation gate signal Sm, and generates or outputs the coil signal IDRV to the coil 150.

Figure 5:
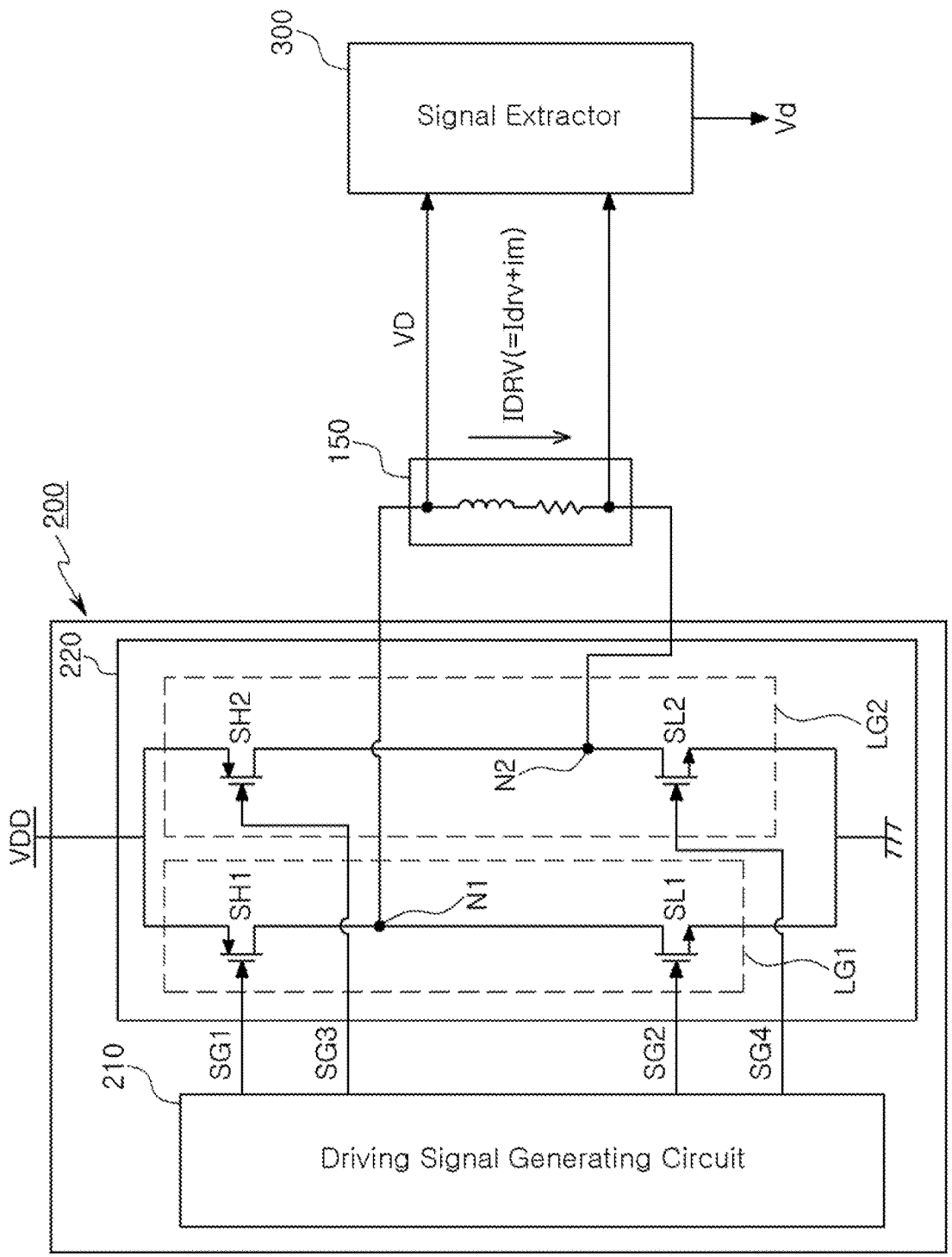
FIG. 5 is a block diagram illustrating another example of a driver of FIG. 3.

FIG. 5 is a block diagram illustrating another example of a driver of FIG. 3.

Referring to FIG. 5, as an example, the driver 200 includes a driving signal generating circuit 210 and a driving switching circuit 220.

The driving signal generating circuit 210 generates a plurality of driving gate signals SG1 to SG4, and overlaps a position confirmation gate signal Sm with one driving gate signal having an active level, among the plurality of driving gate signals SG1 to SG4 to provide an overlapping signal.

The driving switching circuit 220 includes a plurality of driving switches SH1, SH2, SL1, and SL2 connected between a power supply voltage (VDD) terminal and one end N1 of the coil 150, between the power supply voltage (VDD) terminal and the other end N2 of the coil 150, between one end N1 of the coil 150 and a ground, and between the other end N2 of the coil 150 and the ground, respectively. The plurality of driving switches SH1, SH2, SL1, and SL2 generate a coil signal IDRV including the driving signal Idrv and the position confirmation signal im based on the plurality of driving gate signals SG1 to SG4 and the position confirmation gate signal Sm, and output, produced, or generate the coil signal IDRV to the coil 150.

The driving switching circuit 220 includes a first leg LG1 and a second leg LG2. The first leg LG1 includes a first driving switch SH1 and a second driving switch SL1 connected to each other in series between the power supply voltage (VDD) terminal and the ground. The second leg LG2 includes a third driving switch SH2 and a fourth driving switch SL2 connected to each other in series between the power supply voltage (VDD) terminal and the ground.

In an example, the coil 150 is connected between a first node N1 between the first driving switch SH1 and the second driving switch SL1 and a second node N2 between the third driving switch SH2 and the fourth driving switch SL2. The first node N1 may correspond to one end of the coil 150, and the second node N2 may correspond to the other end of the coil 150.

Further, in each embodiment, the driving switching circuit may be driven in a linear driving scheme to control a driving current using voltage levels of the driving gate signals or a pulse width modulation (PWM) scheme to control a driving current using pulse widths of the driving gate signals. In an example in which the driving switching circuit is driven in the linear driving scheme is described in each embodiment in the present application for convenience of explanation, but the driving switching circuit is not limited to being driven in the linear driving scheme.

Figure 6A:
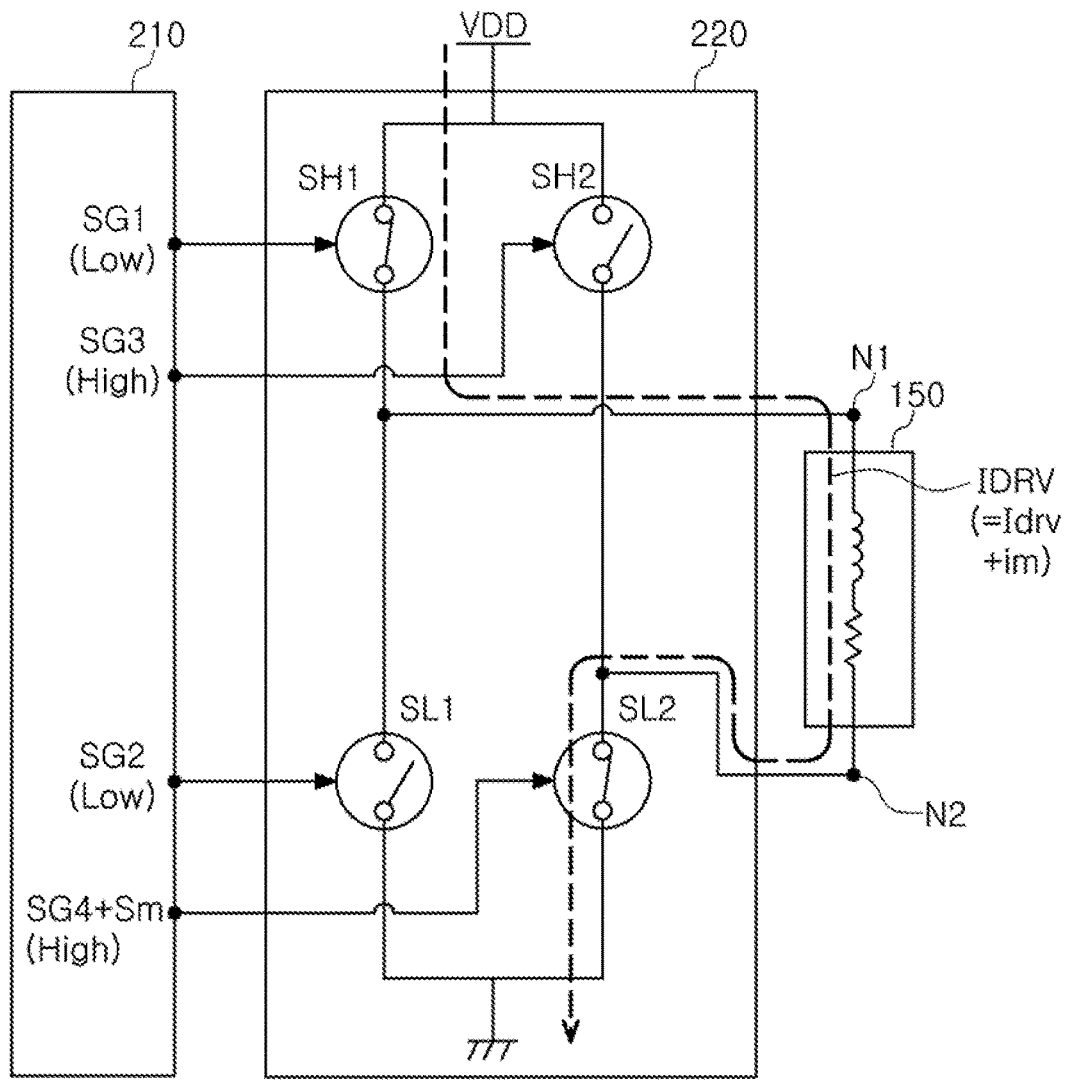
FIG. 6A is a schematic view illustrating an operation of a driving switching circuit of FIG. 5.
Figure 6B:
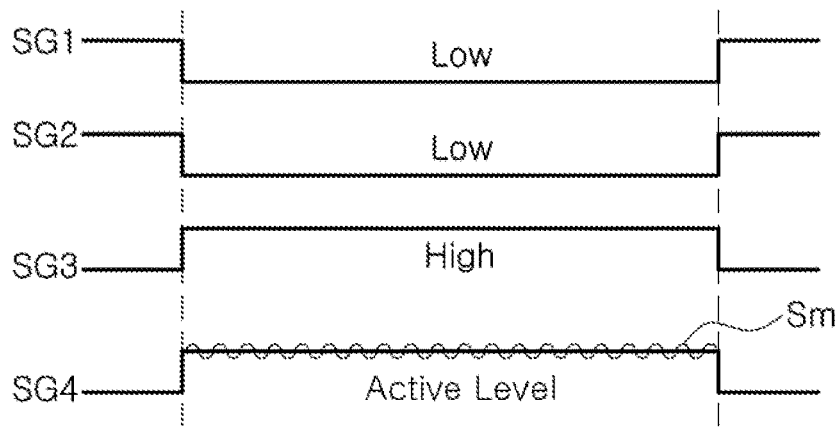
FIG. 6B is a schematic view illustrating waveforms of driving gate signals of a driving switching circuit of FIG. 5.

FIG. 6A is a schematic view illustrating an operation of a driving switching circuit of FIG. 5. FIG. 6B is a schematic view illustrating waveforms of driving gate signals of a driving switching circuit of FIG. 5.

Referring to FIGS. 5 and 6A, in a case in which the first driving switch SH1 and the fourth driving switch SL2 are in an active state and the second driving switch SL1 and the third driving switch SH2 are in an off-state, the coil signal IDRV flows to the coil 150 through the first driving switch SH1 and the fourth driving switch SL2.

Referring to FIGS. 5 and 6B, a first driving gate signal SG1 having an on-level may be provided to the first driving switch SH1, and an overlapping signal in which a fourth driving gate signal SG4 having an active level and the position confirmation gate signal Sm overlap each other are provided to the fourth driving switch SL2. In addition, a second driving gate signal SG2 may have a low level (the second driving switch SL1 is open) and a third driving gate signal SG3 may have an high level (the third driving switch SH2 is open).

As an example, the driving signal Idrv may be controlled by the fourth driving gate signal SG4, and the position conforming signal im may be generated by the position confirmation gate signal Sm. The position confirmation gate signal Sm may include a preset specific frequency component Fmod. In an example, a specific frequency is a fixed frequency used to accurately detect the position of the lens barrel.

Alternatively, although not illustrated in the drawing, the position confirmation gate signal Sm overlaps the first driving gate signal SG1 and is transmitted to or output to the first driving switch SH1.

Figure 7A:
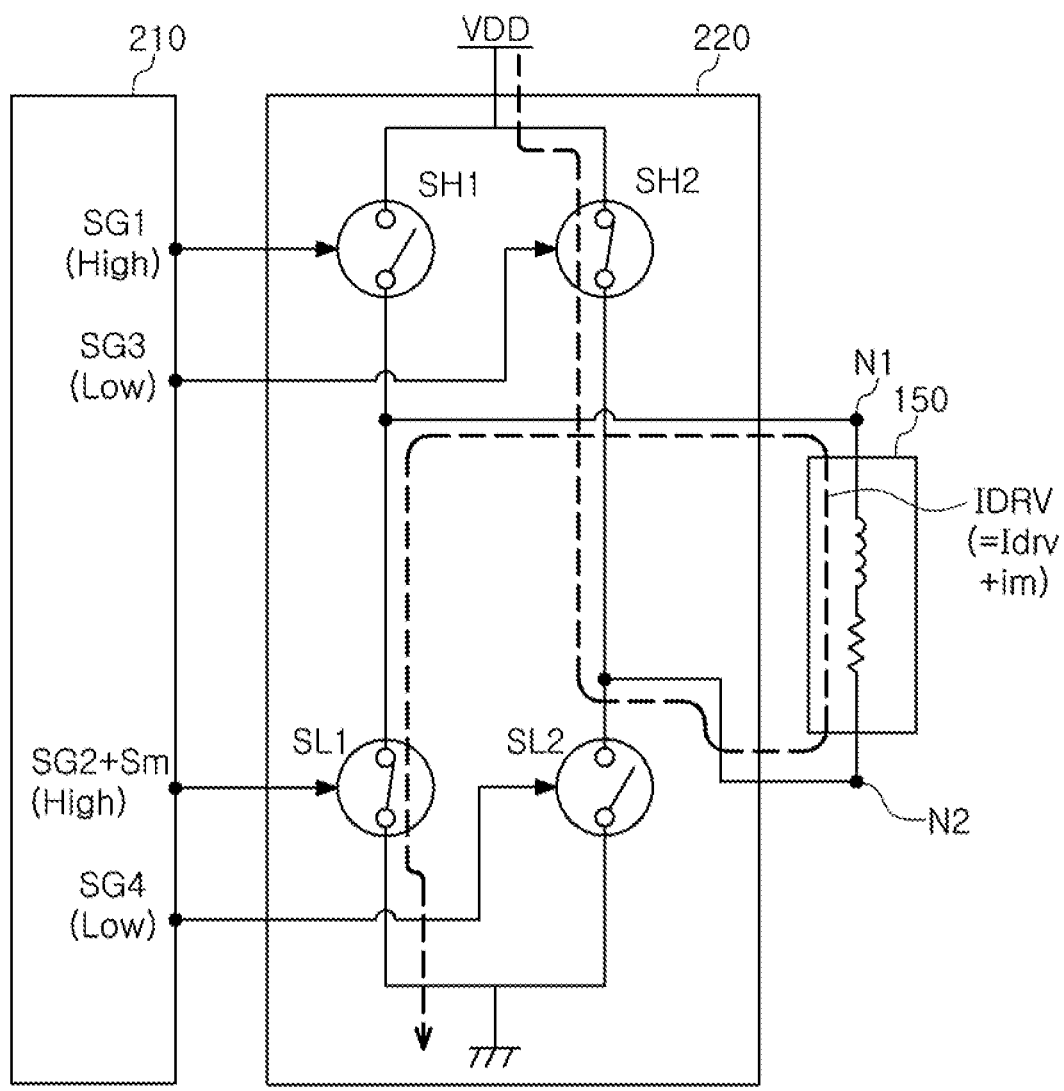
FIG. 7A is another schematic view illustrating an operation of a driving switching circuit of FIG. 5.
Figure 7B:
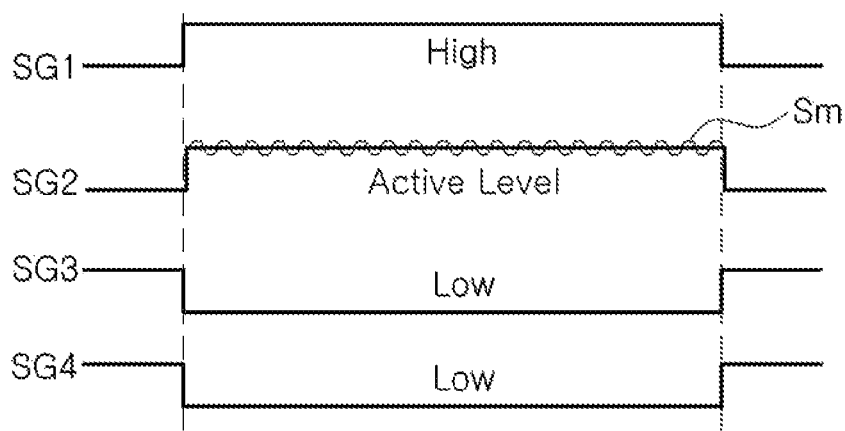
FIG. 7B is another schematic view illustrating waveforms of driving gate signals of a driving switching circuit of FIG. 5.

FIG. 7A is another schematic view illustrating an operation of a driving switching circuit of FIG. 5. FIG. 7B is another schematic view illustrating waveforms of driving gate signals of a driving switching circuit of FIG. 5.

Referring to FIGS. 5 and 7A, in an example in which the first driving switch SH1 and the fourth driving switch SL2 are in an off-state and the second driving switch SL1 and the third driving switch SH2 are in an active state, the coil signal IDRV flows to the coil 150 through the third driving switch SH2 and the second driving switch SL1.

Referring to FIGS. 5 and 7B, a third driving gate signal SG3 having an on-level may be provided to the third driving switch SH2, and an overlapping signal in which a second driving gate signal SG2 having an active level and the position confirmation gate signal Sm overlap each other may be provided to the second driving switch SL1. In addition, a first driving gate signal SG1 may have a high level (the first driving switch SH1 is open) and a fourth driving gate signal SG4 may have a low level (the fourth driving switch SL2 is open).

As an example, the driving signal Idrv may be controlled by the second driving gate signal SG2, and the position conforming signal im may be generated by the position confirmation gate signal Sm. The position confirmation gate signal Sm may include a preset specific frequency component Fmod. Here, a specific frequency may be a fixed frequency of frequencies exceeding the audio frequency in order to accurately detect the position of the lens barrel.

Alternatively, although not illustrated in the drawing, the position confirmation gate signal Sm may overlap the third driving gate signal SG3 and may be provided to the third driving switch SH2.

As described above with reference to FIGS. 5 through 7B, the coil signal IDRV is bidirectionally applied to the coil 150, and the driving force by the coil 150 is bidirectionally generated depending on such a coil signal IDRV that is bidirectionally applied. Therefore, the lens barrel moves in a first direction (for example, a forward direction) or a second direction (for example, a rearward/a backward direction) in the optical axis direction depending on the driving force bidirectionally provided by the coil 150.

The abovementioned description may be a description for one optical axis, but such a principle may also be applied to the directions perpendicular to the optical axis direction.

In the embodiment in the present application, in a case in which the position confirmation signal im is the AC position confirmation current and the detected signal Vd is the detected AC voltage, when the driver 200 applies the AC position confirmation current to the coil 150, the detected AC voltage Vd across the coil 150 is measured. Therefore, the impedance of the coil 150 is measured on the basis of the AC position confirmation current and the detected AC voltage Vd.

In addition, a structure of 'current applying->voltage sensing' is described by way of example in the embodiment, but a structure of 'voltage applying->current sensing' is also possible.

Figure 8:
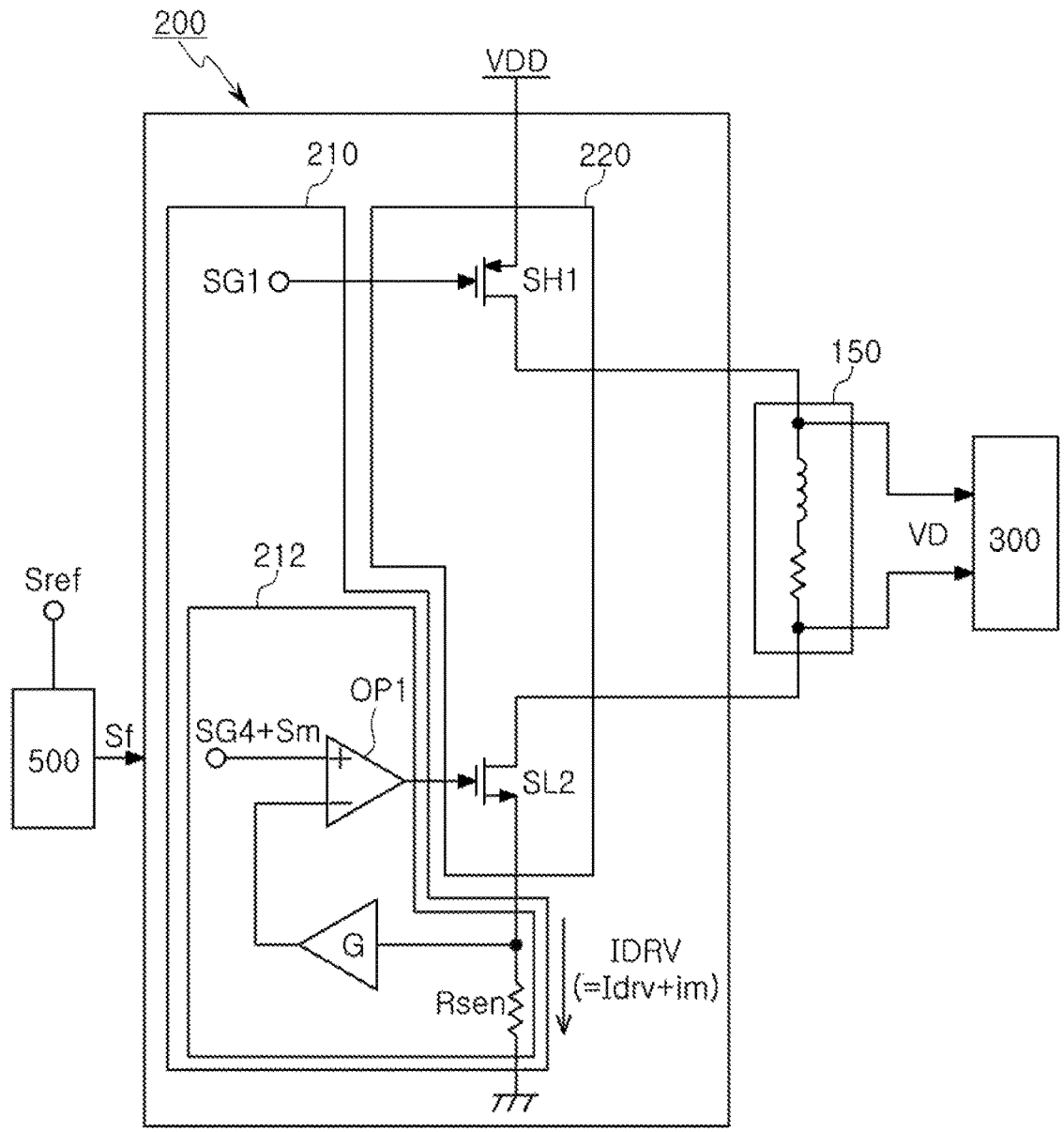
FIG. 8 is a block diagram illustrating a driving signal generating circuit of FIG. 5.

FIG. 8 is a block diagram illustrating a driving signal generating circuit of FIG. 5.

Referring to FIG. 8, as an example, the driving signal generating circuit 210 of the driver 200 includes a constant current circuit 212. The constant current circuit 212 includes an operational amplifier OP1 and a resistor Rsen to control a driving signal based on a driving target value, and further includes a gain controlling unit G.

In the constant current circuit 212 of FIG. 8, the operational amplifier OP1 includes a non-inverting input terminal receiving a signal in which the fourth driving gate signal SG4 and the position confirmation gate signal Sm overlap each other, an output terminal connected to the fourth driving switch SL2, and an inverting input terminal receiving a detected voltage by the resistor Rsen through the gain controlling unit G.

The resistor Rsen is connected between the fourth driving switch SL2 and the ground, detects a current flowing to the coil 150, and outputs or transmits the detected voltage to the inverting input terminal of the operational amplifier OP1 through the gain controlling unit G.

As an example, the operational amplifier OP1 controls a current flowing through the fourth driving switch SL2 based on the signal input to the non-inverting input terminal and a voltage input to the inverting input terminal. As an example, the fourth driving gate signal SG4 is controlled based on the feedback signal Sf.

The voltage input to the inverting input terminal of the operational amplifier OP1 is determined by multiplying the voltage by the resistor Rsen and a gain of the gain controlling unit G. The gain of the gain controlling unit G may be 1.

The constant current circuit 212 illustrated in FIG. 8 is only an example, and the gate signal generating circuit of the driver according to each exemplary embodiment in the present application is not limited to a structure illustrated in FIG. 8.

Furthermore, a position detecting principle, according to an embodiment, will be described with reference to FIGS. 1 through 8. In the camera module, according to an embodiment, a static magnetic field is formed in the coil 150 and the magnetic member 160 at a time that the camera module is driven. In this example, when the AC position confirmation signal im is applied to the coil, the static magnetic field changes to a dynamic magnetic field, and an Eddy current is generated in the magnetic member 160 by such a dynamic magnetic field.

Further, the Eddy current is generated when a magnetic field changed over time passes through a conductor. When the magnetic field is changed, a circulating current of electrons are generated in the conductor. Such a circulating current is called an Eddy current. Such an Eddy current may have a direction hindering a change in the magnetic field passing through a magnetic member. The Eddy current may be generated when the magnetic member (or the conductor) moves within the magnetic field or a varying magnetic field passes through a static conductor. In addition, the Eddy current may also be generated when the magnetic member (or the conductor) moves in a varying magnetic field. That is, the Eddy current may be generated in any portions except for boundary points of the magnetic member (or the conductor) in the magnetic field when a change in strength or a direction of the magnetic field exists.

Then, when a change is generated in an interval, an overlapping area, or the like, between the coil 150 and the magnetic member 160, the Eddy current in the magnetic member 160 may be changed, and a change in the magnetic field depending on the change in the Eddy current may have an influence on the coil to generate a change in the impedance of the coil.

As an example, the changes in the Eddy current of the magnetic member generated due to the AC position confirmation signal and the magnetic field may be generated depending on a relative position (for example, the interval, the overlapping area, or the like) between the coil and the magnetic member, and may be reflected in the impedance of the coil.

As described above, the change in the magnetic field and the change in the Eddy current may be generated due to the change in the interval, the overlapping area, or the like, between the coil 150 and the magnetic member 160, such that an amount of change in the impedance of the coil may be generated.

An example of the overlapping area between the coil 150 and the magnetic member 160 will be described with reference to FIGS. 9A through 9D.

FIGS. 9A through 9D are schematic views illustrating relative positions of a magnetic member to a coil according to an example.

Figure 9A:
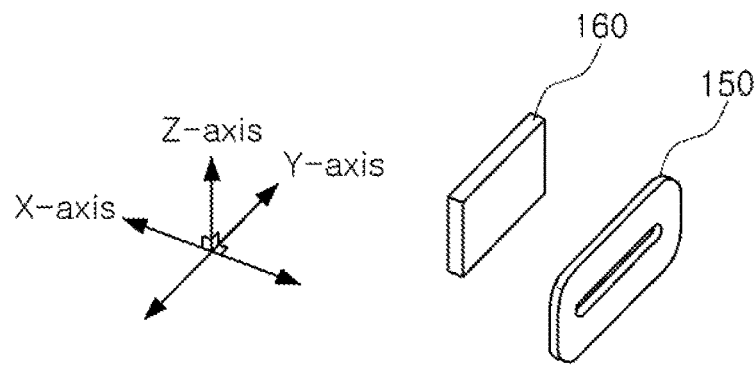
FIGS. 9A through 9D are schematic views illustrating relative positions of a magnetic member to a coil, according to an example.
Figure 9B:
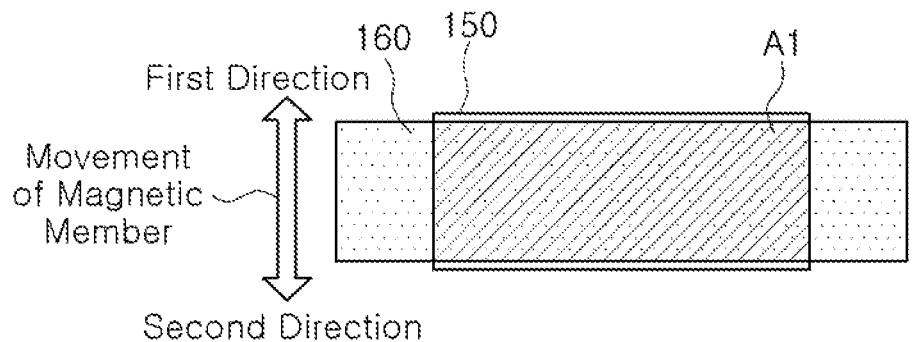
Figure 9C:
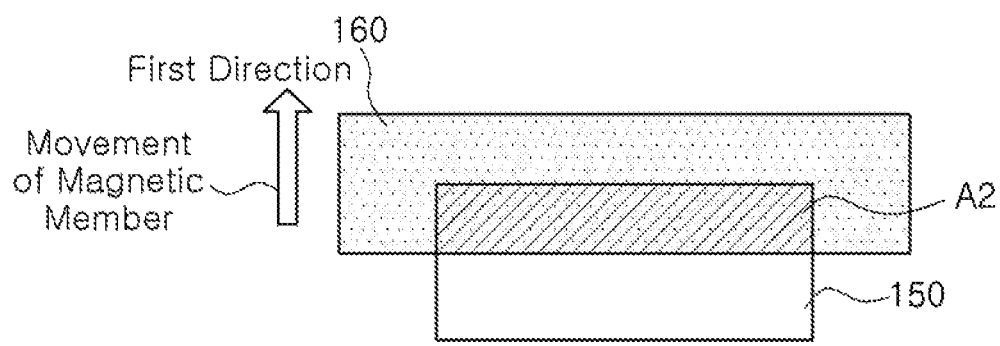
Figure 9D:
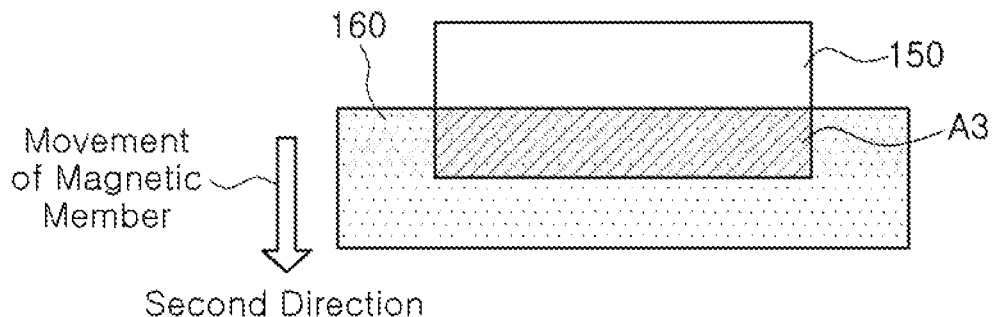

FIG. 9A is a schematic view illustrating a coil and a magnetic member in X-axis, Y-axis, and Z-axis directions according to an example, FIG. 9B is a schematic view illustrating a regular position of the magnetic member with respect to the coil according to an example, FIG. 9C is a schematic view illustrating a position of the magnetic member ascending in the Z-axis direction with respect to the coil according to an example, and FIG. 9D is a schematic view illustrating a position of the magnetic member descending in the Z-axis direction with respect to the coil according to an example.

Referring to FIG. 9A, as illustrated in FIG. 1, the coil 150 and the magnetic member 160 are disposed to face each other, the Z-axis direction refers to the optical axis direction, and the X-axis direction and the Y-axis direction refer to the directions perpendicular to the optical axis direction.

The magnetic member 160 illustrated in FIG. 9B is disposed at a regular position corresponding to a preset default value. In this example, the overlapping area between the coil and the magnetic member determining the driving force is an area A1.

As an example, the magnetic member 160 moves in a first direction or a second direction of the Z-axis direction, the optical axis direction, in relation to the coil 150 by the driving force.

The magnetic member 160 illustrated in FIG. 9C is disposed in a position ascending in the Z-axis direction by a driving signal of the coil 150 in the first direction. In this example, the overlapping area between the coil and the magnetic member, determining strength of an electromagnetic field between the coil 150 and the magnetic member 160, may be changed into an area A2 smaller than the area A1.

The magnetic member 160 illustrated in FIG. 9D is disposed in a position descending in the Z-axis direction by a driving signal of the coil 150 in the second direction. In this example, the overlapping area between the coil and the magnetic member determining strength of an electromagnetic field between the coil 150 and the magnetic member 160 changes into an area A3 smaller than the area A1.

As described above, upon the magnetic field 160 moving in the Z-axis direction, the overlapping area between the coil 150 and the magnetic member 160 is changed into A1, A2, or A3, and the strength of the electromagnetic field between the coil 150 and the magnetic member 160 may change, resulting in the change in the inductance of the coil 150.

As described above, when the impedance of the coil 150 changes during a period in which the AC position confirmation current included in the coil signal is supplied to the coil 150, the AC voltage across the coil 150 changes depending on such a change in the impedance of the coil 150.

Figure 10A:
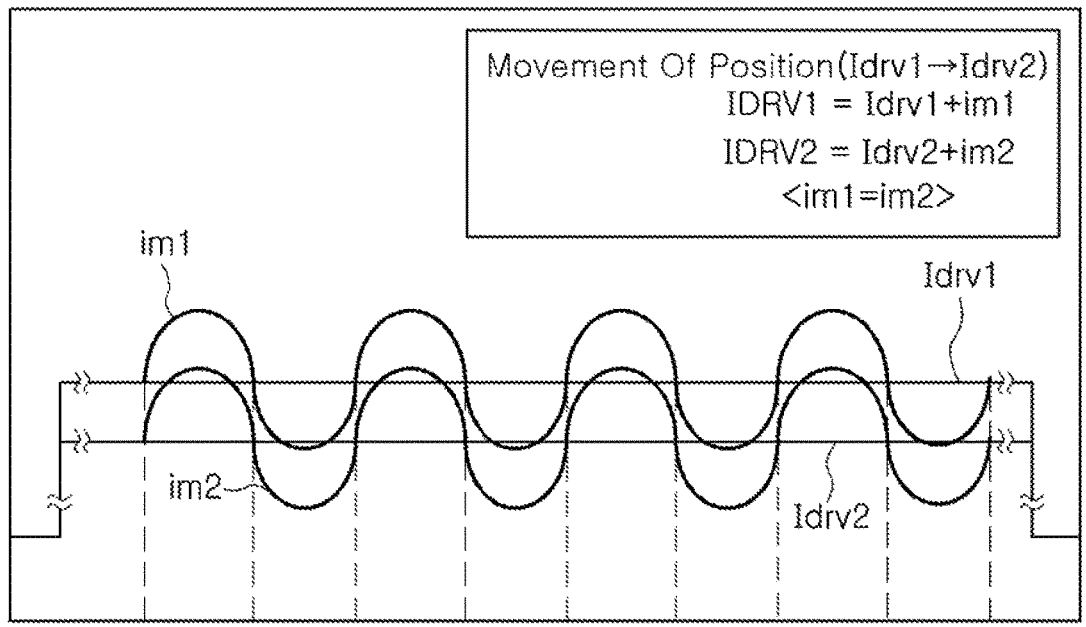
FIG. 10A is a schematic view illustrating first and second driving signals and position confirmation signals, according to an example.
Figure 10B:
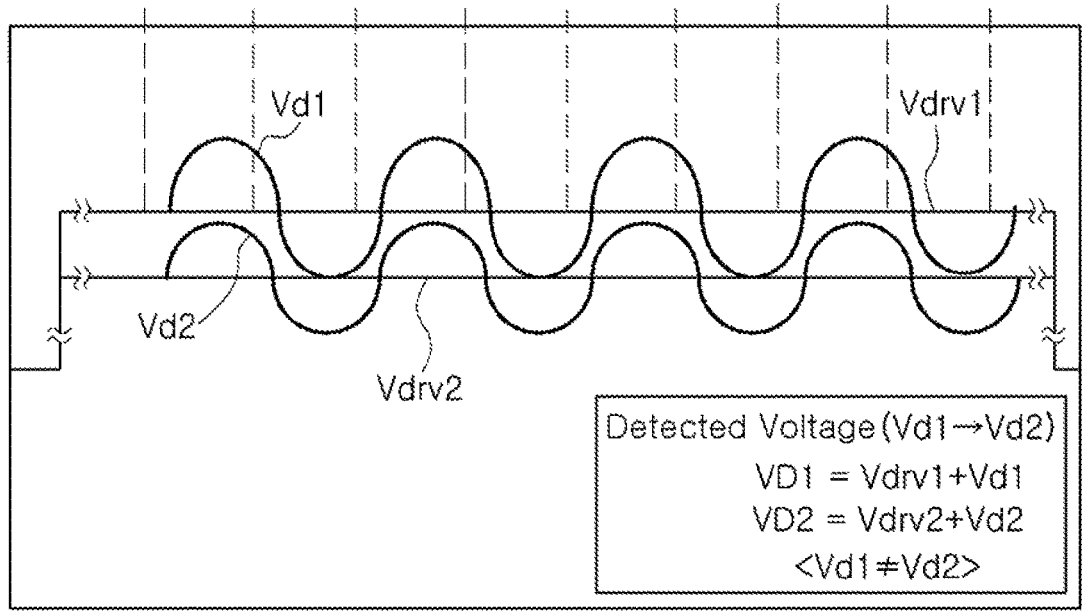
FIG. 10B is a schematic view illustrating a first detected signal and a second detected signal, according to an example.

FIG. 10A is a schematic view illustrating first and second driving signals Idrv1 and Idrv2 and position confirmation signals im1 and im2, according to an example. FIG. 10B is a schematic view illustrating a first detected signal Vd1 and a second detected signal Vd2, according to an example.

Referring to FIG. 10A, IDRV1 is a first coil signal, IDRV2 is a second coil signal, Idrv1 is a first driving signal, Idrv2 is a second driving signal, im1 is a position confirmation signal overlapping the first driving signal Idrv1, and im2 may be a position confirmation signal overlapping the second driving signal Idrv2. In an example, the two position confirmation signals im1 and im2 are signals of which amplitudes and frequencies are equal or the same as each other.

Referring to FIG. 10B, VD1 is a first voltage across the coil 150, VD2 is a second voltage across the coil 150, Vd1 is a first detected voltage extracted by the signal extractor 300 from the voltage VD across the coil 150, depending on the first driving signal Idrv1, and Vd2 is a second detected voltage extracted by the signal extractor 300 from the voltage VD across the coil 150, depending on the second driving signal Idrv2.

Further, the first detected voltage Vd1 is a detected voltage appearing by the first driving signal Idrv1, and the second detected voltage Vd2 is a detected voltage appearing by the second driving signal Idrv2. Therefore, magnitudes of the first and second detected voltages Vd1 and Vd2 are different from each other.

As an example, the first detected voltage Vd1, an AC voltage, appearing across the coil 150 at a first position of the lens barrel 130, and the second detected voltage Vd2, an AC voltage, appearing across the coil 150 at a second position of the lens barrel 130 moving from the first position later are different from each other. Therefore, the position of the lens barrel is accurately recognized by detecting a maximum value of the detected AC voltage Vd1 or Vd2 appearing across the coil 150.

In detail, when the driving gate signal is controlled in order to control the position, the driving current of the coil is controlled. When the driving current changes, the magnetic field changes such that the driving force corresponding to the electromagnetic force between the coil and the magnetic member is controlled. Therefore, the position of the lens barrel on which the magnetic member is mounted changes. Then, the Eddy current generated in the magnetic member by the AC position confirmation current changes due to a change in the relative position between the coil and the magnetic member. Also, the change in the magnetic field depending on the change in the Eddy current has an influence on the coil to generate the change in the impedance of the coil.

Therefore, the Eddy current generated in the magnetic member by the AC position confirmation signal changes depending on the change in the relative position (for example, the interval, the overlapping area, or the like) between the coil and the magnetic member. The change in the magnetic field between the coil and the magnetic member is generated depending on the change in the Eddy current, and such a change in the magnetic field is reflected in the impedance of the coil. Due to such a change in the impedance of the coil, the detected AC voltage of the measured voltages across the coil changes (see FIGS. 10A and 10B, Vd1->Vd2) even though the position confirmation current does not change (see FIGS. 10A and 10B, im1=im2).

In addition, the change amount in the impedance of the coil is generated by the change in the magnetic field and the change in the Eddy current due to the change in the interval or the overlapping area, between the coil 150 and the magnetic member 160, which generates a difference in an amplitude, a peak value, a phase, or a root mean square (RMS), of the detected signal.

Therefore, the peak detector 400 detects the peak value of the detected signal extracted by the signal extractor 300, and detects the change in the impedance of the coil 150 to recognize the position based on the peak value.

According to an embodiment, a magnetic member having high magnetic permeability and paint formed of a magnetic material is disposed between the magnetic member 160 and the coil 150 in order to raise a change ratio in the inductance of the coil 150, depending on the movement of the position of the magnetic member 160.

As an example, when the coil signal IDRV of the coil 150 is the coil current, the signal extractor 300 extracts the detected voltage Vd, including the specific frequency component Fmod, from the coil voltage VD, the voltage across the coil 150 by the coil current IDRV of the coil 150, and outputs the detected voltage to the peak detector 400.

The peak detector 400 detects a magnitude |ZL| of the impedance ZL of the coil 150 using the position confirmation current im included in the coil current IDRV and the detected voltage Vd, and detects the position of the magnetic member 160, that is, the position of the lens barrel 130 using the magnitude |ZL| of the impedance ZL of the coil 150.

In an embodiment, the magnitude |ZL| of impedance ZL of the coil 150 is detected using the peak value of the detected signal Vd and the position confirmation signal im, and the position signal Sp corresponding to the position of the magnetic member 160 is output, produced, or generated based on the magnitude |ZL| the impedance of the coil 150.

In this Example, the magnitude |ZL| of the impedance is represented by the following Equation 2:

$$VD = IDRV * |ZL|.$$ [Equation 2]

Here, VD is the voltage across the coil, IDRV is the coil current flowing to the coil and |ZL| is the magnitude of the impedance of the coil.

In addition, the magnitude |ZL| of the impedance of the coil 150 is represented by the following Equation 3:

$$|ZL| = \sqrt{Rs^2 + (2*\pi*Fmod*Lx)^2}.$$ [Equation 3]

Here, Rs is a resistance component of the coil 150, Lx is an inductance component of the coil 150, and Fmod, a specific frequency component, is an audio frequency.

As an example, the peak detector 400 includes an amplifying circuit amplifying an amount of change in the inductance of the coil 150 since the change amount in the inductance of the coil 150 is very low.

Examples of peak detectors 400, according to various embodiments, will be described with reference to FIGS. 11 through 13. However, the peak detectors 400 are not limited thereto.

FIG. 11 is a block diagram illustrating an example of a peak detector, according to an example.

Referring to FIG. 11, the peak detector 400 includes a rectifying circuit 410. In addition, the peak detector 400 further includes an input buffer 410-B1 and an output buffer 410-B2 connected, respectively, to an input terminal and an output terminal of the rectifying circuit 410.

As an example, the rectifying circuit 410 includes one diode and one capacitor. An AC input signal passes through the diode. The input signal passing through the diode is stored in the capacitor. Resultantly, a peak value is detected by the rectifying circuit through such a process.

Therefore, the rectifying circuit 410 rectifies the detected signal Vd and provides a peak value of the rectified signal as the position signal Sp.

FIG. 12 is a schematic view illustrating waveforms of an input signal and an output signal of the peak detector of FIG. 11.

The input signal of the peak detector 400 illustrated in FIG. 12 is a waveform for the AC detected signal Vd, and the output signal of the peak detector 400 is a peak voltage of the signal rectified from the AC detected signal Vd.

Figure 14A:
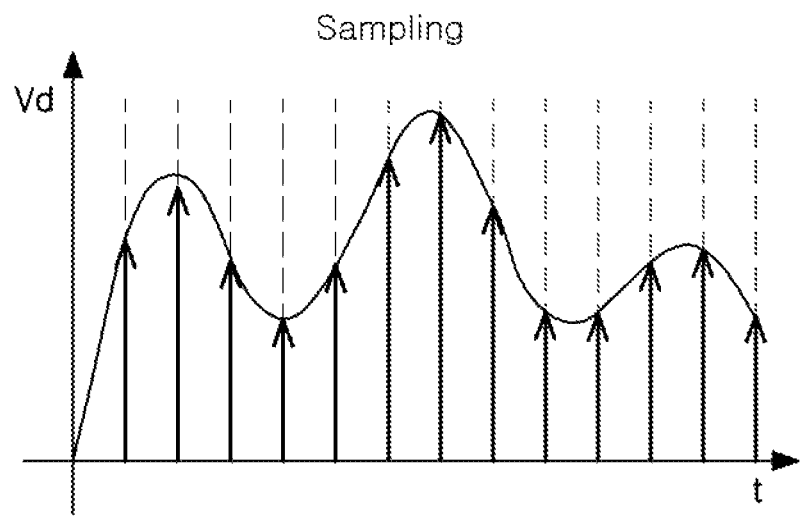
FIG. 14A is a view illustrating a sampling operation of a sample/hold circuit of the peak detector.
Figure 14B:
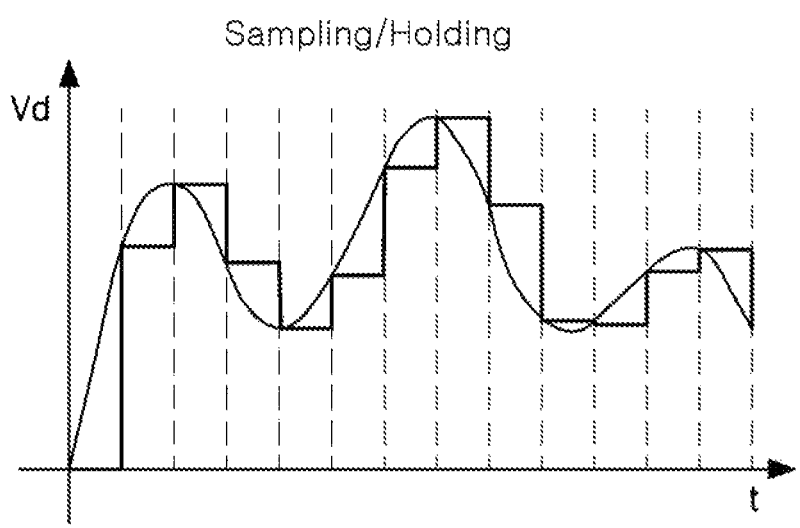
FIG. 14B is a view illustrating a holding operation of the sample/hold circuit of the peak detector.

FIG. 13 is a block diagram illustrating another example of a peak detector, according to an example. FIG. 14A is a view illustrating a sampling operation of a sample/hold circuit 420 of the peak detector. FIG. 14B is a view illustrating a holding operation of the sample/hold circuit 420 of the peak detector.

Referring to FIGS. 13 through 14B, the peak detector 400 include a sample/hold circuit 420 and a maximum value detector 430.

In addition, the peak detector 400 further includes an input buffer 420-B1 connected to an input terminal of the sample/hold circuit 420 and an output buffer 430-B1 connected to an output terminal of the maximum value detector 430.

The sample/hold circuit 420 samples and holds the detected signal Vd, and provides the sampled and held signal to the maximum value detector 430.

As an example, the sample/hold circuit 420 may include one switch (for example, a metal oxide semiconductor field effect transistor (MOSFET)) and one capacitor. The sample/hold circuit 420 may transfer an input signal to the capacitor when the switch is turned on and may not transfer the input signal to the capacitor when the switch is turned off. In this case, a voltage of the capacitor may be maintained at a predetermined level. Resultantly, a level of the input signal may be sampled and held through such a process.

The maximum value detector 430 detects a maximum value among signals sampled and held by the sample/hold circuit 420, and outputs the maximum value as the position signal Sp.

As set forth above, according to various embodiments, a separate sensor such as a hall sensor, or similar structural element, is not used, such that a manufacturing cost is reduced, space efficiency is improved, power consumption is reduced, and miniaturization of the apparatus to control a position of a camera module is possible.

In addition, sensing and driving is performed through one coil, and a closed loop position control is performed in a sensing scheme that does not have an influence on driving through one coil, such that a position control is more stably and precisely performed.

Further, a defect element that may occur at the time of manufacturing the apparatus to control a position of a camera module and a process are simplified, such that an additional effect and a direct effect is accomplished. The apparatus to control a position of a camera module does not include a separate sensor, such that the apparatus to control a position of a camera module is simply applied to an optical image stabilization (OIS) actuator or an optical zoom function and an autofocusing actuator.

The detectors, the magnetic members, the signal extractor, the driver in FIGS. 2, 3-5, and 13 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application.

The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus to control a position of a camera module, comprising:
    a magnetic member disposed on a lens barrel of the camera module;
    a coil disposed opposite to the magnetic member;
    a driver configured to generate, to the coil, a position confirmation signal comprising a specific frequency component;
    a signal extractor configured to extract a detected signal, comprising the specific frequency component, from a coil signal of the coil; and
    a peak detector configured to detect a peak value of the detected signal and output a position signal corresponding to a position of the magnetic member based on the peak value,
    wherein the driver comprises;
        a driving signal generating circuit configured to generate driving gate signals and to overlap a position confirmation gate signal with a driving gate signal having an active level, among the driving gate signals, to output an overlapping signal; and
        a driving switching circuit comprising driving switches connected between a power supply voltage terminal and one end of the coil, between the power supply voltage terminal and another end of the coil, between one end of the coil and a ground, and between another end of the coil and the ground, respectively.

2. The apparatus of claim 1, wherein the peak detector is further configured to detect impedance of the coil using the peak value of the detected signal and the position confirmation signal, and output the position signal corresponding to the position of the magnetic member based on the impedance of the coil.

3. The apparatus of claim 1, wherein the driving switches are configured to generate a driving signal and the position confirmation signal based on the driving gate signals and the position confirmation gate signal and output the driving signal and the position confirmation signal to the coil.

4. The apparatus of claim 1, wherein the driving switching circuit is configured in one of a half bridge form in which the coil is unidirectionally driven from a reference point and a full bridge form in which the coil is bidirectionally driven from a reference point.

5. The apparatus of claim 1, wherein the driving signal is a direct current (DC) current,
    the position confirmation signal is an alternating current (AC) current comprising the specific frequency component, and
    the detected signal is an AC voltage comprising the specific frequency component.

6. The apparatus of claim 1, further comprising:
    a controller configured to generate a feedback signal to the driver to control a position error, based on the position signal from the peak detector and a position reference signal.

7. The apparatus of claim 1, wherein the peak detector comprises a rectifying circuit configured to rectify the detected signal, generate a rectified signal indicative thereof, and output the rectified signal as the position signal.

8. The apparatus of claim 1, wherein the peak detector comprises:
    a sample/hold circuit configured to sample and hold the detected signal; and
    a maximum value detector configured to detect a maximum value among signals sampled and held by the sample/hold circuit and output the maximum value as the position signal.

9. The apparatus of claim 1, further comprising:
    a controller configured to calculate an impedance of the coil using a ratio between a detected voltage and a position confirmation current, wherein the detected signal is the detected voltage and the position confirmation signal is the position confirmation current.

10. An apparatus to control a position of a camera module, comprising:

a magnetic member disposed on a lens barrel of the camera module;

a coil disposed to face the magnetic member;

a driver configured to generate, to the coil, a position confirmation signal comprising a specific frequency component;

a signal extractor configured to extract a detected signal, comprising the specific frequency component, based on a coil signal of the coil; and a peak detector configured to detect a magnitude of impedance of the coil using a maximum value of the detected signal and the position confirmation signal and output a position signal corresponding to a position of the magnetic member based on the magnitude of the impedance of the coil, wherein the driver comprises;

a driving signal generating circuit configured to generate driving gate signals and overlap a position confirmation gate signal with a driving gate signal comprising an active level, among the driving gate signals, to generate an overlapping signal; and a driving switching circuit comprising driving switches connected between a power supply voltage terminal and one end of the coil, between the power supply voltage terminal and another end of the coil, between one end of the coil and a ground, and between another end of the coil and the ground, respectively.

11. The apparatus of claim 10, wherein the driving switches are configured to generate a driving signal and the position confirmation signal based on the driving gate signals and the position confirmation gate signal and output the driving signal and the position confirmation signal to the coil.

12. The apparatus of claim 10, wherein the driving signal is a DC current, wherein the position confirmation signal is an AC current having the specific frequency component, and wherein the detected signal is an AC voltage comprising the specific frequency component.

13. The apparatus of claim 10, further comprising:

a controller configured to produce a feedback signal to the driver to control a position error, based on the position signal from the peak detector and a position reference signal.

14. The apparatus of claim 10, wherein the peak detector comprises a rectifying circuit configured to rectify the detected signal and output the rectified signal as the position signal.

15. The apparatus of claim 10, wherein the peak detector comprises:

a sample/hold circuit configured to sample and hold the detected signal; and a maximum value detector configured to detect a maximum value among signals sampled and held by the sample/hold circuit and output the maximum value as the position signal.

* * * * *